US012507992B2

(12) United States Patent
Maciá Barber et al.

(10) Patent No.: US 12,507,992 B2
(45) Date of Patent: Dec. 30, 2025

(54) WEARABLE ULTRASOUND APPARATUS, SYSTEM, AND METHOD

(71) Applicant: Dawako Medtech, S.L., Paterna (ES)

(72) Inventors: Agustín Maciá Barber, Paterna (ES); Daniel Cerdán García, Paterna (ES); Víctor Manuel García Chocano, Paterna (ES); Sara Nozal Fernández, Paterna (ES); Eduardo Jorge Godoy, Paterna (ES)

(73) Assignee: Dawako Medtech, S.L., Paterna (ES)

( * ) Notice: Subject to any disclaimer, the term of this patent is extended or adjusted under 35 U.S.C. 154(b) by 385 days.

(21) Appl. No.: 18/122,111

(22) Filed: Mar. 15, 2023

(65) Prior Publication Data

US 2024/0307033 A1　Sep. 19, 2024

(51) Int. Cl.
*A61B 8/00*　　(2006.01)
*A61B 5/00*　　(2006.01)
(Continued)

(52) U.S. Cl.
CPC .......... *A61B 8/4427* (2013.01); *A61B 5/0022* (2013.01); *A61B 5/256* (2021.01);
(Continued)

(58) Field of Classification Search
CPC ..... A61B 8/4427; A61B 5/0022; A61B 5/256; A61B 5/282; A61B 5/296; A61B 8/4461;
(Continued)

(56) References Cited

U.S. PATENT DOCUMENTS

2003/0214379　A1*　11/2003　Satoh ..................... A61B 8/145
　　　　　　　　　　　　　　　　　　　　　　　　　　　336/200
2010/0174189　A1*　7/2010　Abraham ............. A61B 8/4236
　　　　　　　　　　　　　　　　　　　　　　　　　　　600/439
(Continued)

OTHER PUBLICATIONS

Waasdorp et al., "Combining Ultrafast Ultrasound and High-Density EMG to Assess Local Electromechanical Muscle Dynamics: A Feasibility Study", 2021 (Year: 2021).*

*Primary Examiner* — Adil Partap S Virk
(74) *Attorney, Agent, or Firm* — ENTRALTA PLLC; James F. Fleming; Peter D. Weinstein

(57) ABSTRACT

A wearable medical device, system and method are disclosed herein. The wearable medical device is placeable on a target site of a subject's body and includes a rotary coupling component and an electrode patch. When the electrode patch is attached to the rotary coupling component, electrodes of the patch's electrode array are electrically coupled to corresponding tracks of the conductive tracks. The wearable medical device also includes an ultrasound scanning and biomarker monitoring module having a set of conductive contacts. When the ultrasound scanning and biomarker monitoring module is attached to the rotary coupling component opposite the electrode patch, the set of conductive contacts are engaged with corresponding tracks of the conductive tracks. The ultrasound scanning and biomarker monitoring module is further configured to rotate about the rotary coupling component with the conductive contacts remaining engaged with the corresponding tracks during rotation.

7 Claims, 8 Drawing Sheets

(51) Int. Cl.
  *A61B 5/256* (2021.01)
  *A61B 5/282* (2021.01)
  *A61B 5/296* (2021.01)

(52) U.S. Cl.
  CPC .............. *A61B 5/282* (2021.01); *A61B 5/296* (2021.01); *A61B 8/4461* (2013.01); *A61B 8/565* (2013.01); *A61B 2562/0219* (2013.01)

(58) Field of Classification Search
  CPC ............ A61B 8/565; A61B 2562/0219; A61B 8/5207; A61B 8/5223; A61B 8/4477; A61B 8/4483; A61B 8/4411; A61B 8/4455; A61B 8/4472; A61B 8/4272; A61B 8/4236; A61B 8/543; A61B 8/0858
  See application file for complete search history.

(56) References Cited

U.S. PATENT DOCUMENTS

| | | | |
|---|---|---|---|
| 2012/0065479 A1* | 3/2012 | Lahiji | A61B 8/4427 |
| | | | 600/459 |
| 2012/0232398 A1* | 9/2012 | Roham | A61B 8/565 |
| | | | 600/528 |
| 2017/0105700 A1* | 4/2017 | Bar-Zion | A61B 8/0891 |
| 2018/0220972 A1* | 8/2018 | Jeong | A61B 5/7475 |
| 2019/0239769 A1* | 8/2019 | Lee | A61B 5/282 |
| 2021/0345939 A1* | 11/2021 | Jumbe | H04R 1/028 |

* cited by examiner

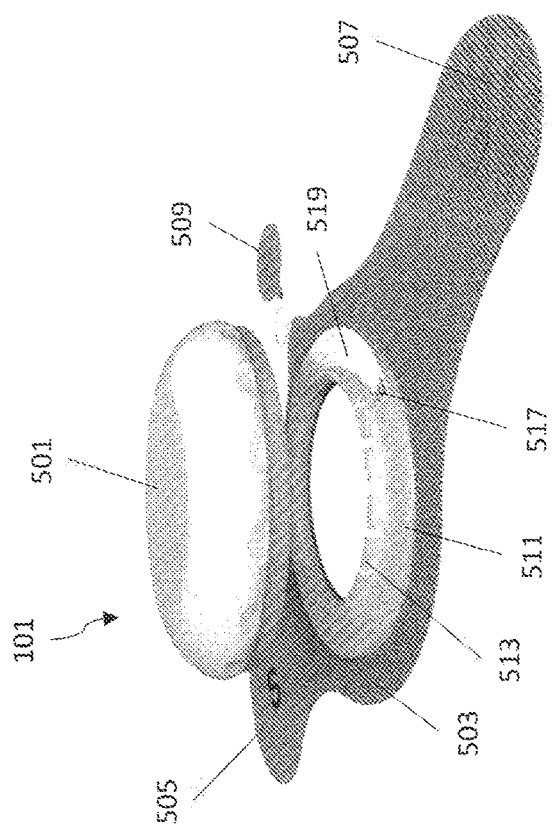
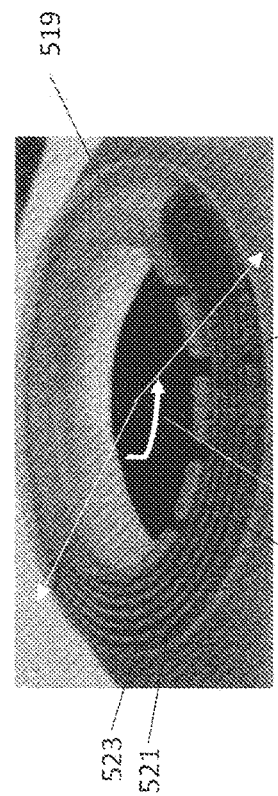
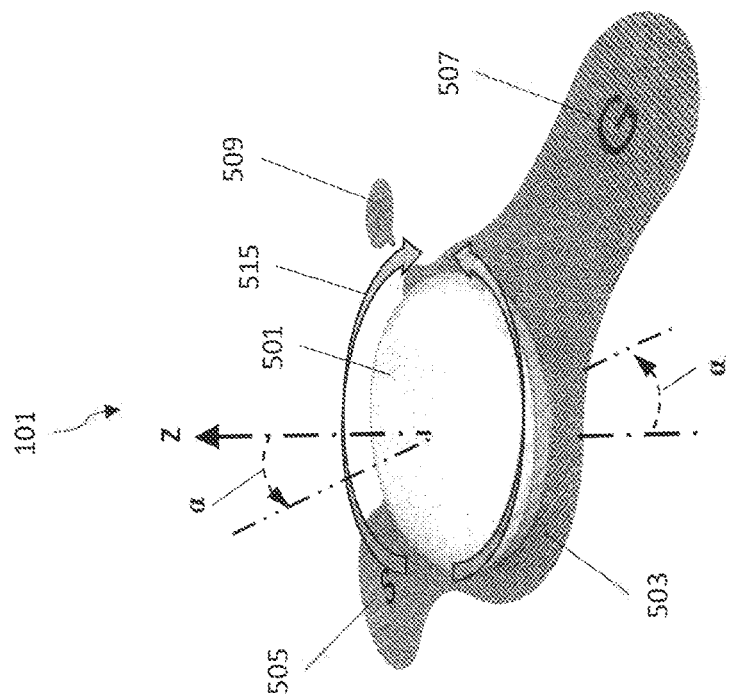
FIG. 3B
FIG. 3C
FIG. 3A

WEARABLE ULTRASOUND APPARATUS, SYSTEM, AND METHOD

FIELD OF THE DISCLOSURE

The present disclosure relates generally to ultrasound devices, and more particularly to a wearable ultrasound apparatus configured for use in connection with various biomedical applications.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

SUMMARY

According to aspects of the disclosed subject matter, a wearable ultrasound apparatus is described that is configured for use in connection with various biomedical applications, including musculoskeletal ("MSK") imaging and analysis. In at least one embodiment, the apparatus provides at least one of an ultrasound module configured for obtaining ultrasound images of a portion of a user's body on which the at least one ultrasound module is positioned (hereinafter referred to as the "target site" for simplicity purposes), and surface electromyography ("sEMG") module configured for detecting muscle contractions of the target site."). The ultrasound module is configured to adjust between different axis of operation to obtain ultrasound images of the target site through different cutting planes. The ultrasound module is communicatively coupled (e.g., via a communication network) to an image processing system configured to process and analyze the images along with the biomedical data obtained by the sEMG module to identify biomarkers and bio-signals and to produce structured reports for evaluation by a qualified healthcare professional.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A, 3B and 3C illustrate a perspective view, an exploded view, and a magnified view, respectively, of a wearable medical device according to one or more aspects of the disclosed subject matter;

DETAILED DESCRIPTION

Figure 1:
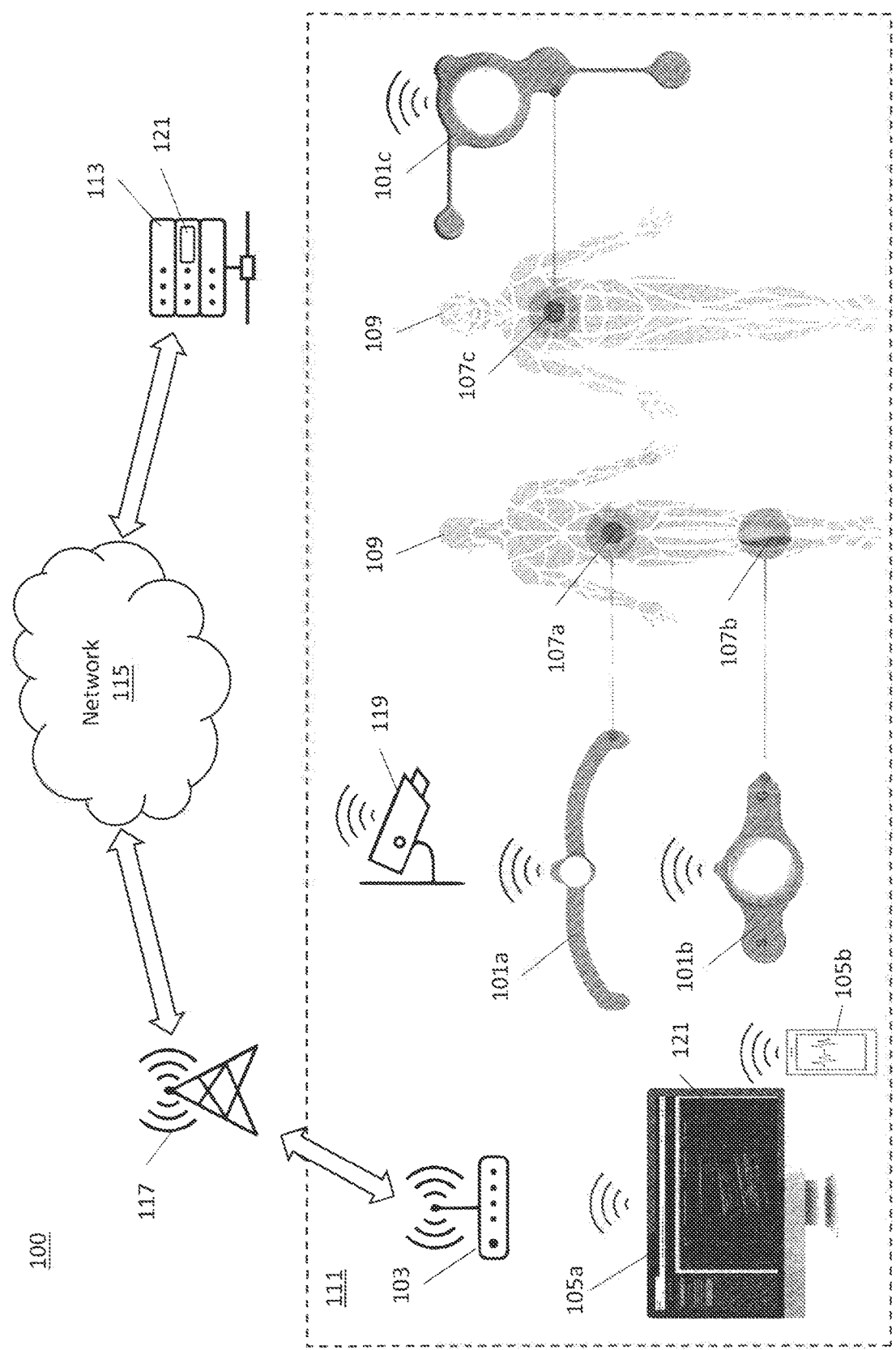
FIG. 1 illustrates an ultrasound imaging and biomarker system, according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Embodiments of a wearable medical device, system and method are disclosed herein. The wearable medical device is placeable on a target site of a subject's body and includes a rotary coupling component and an electrode patch. When the electrode patch is attached to the rotary coupling component, electrodes of the patch's electrode array are electrically coupled to corresponding tracks of the conductive tracks. The wearable medical device also includes an scanning and monitoring module having a set of conductive contacts. When the scanning and monitoring module is attached to the rotary coupling component opposite the electrode patch, the set of conductive contacts are engaged with corresponding tracks of the plurality of conductive tracks. The scanning and monitoring module is further configured to rotate about the rotary coupling component with the plurality of conductive contacts remaining engaged with the corresponding tracks during rotation of the scanning and monitoring module.

Referring now to the drawings, wherein like reference numerals designate identical or corresponding parts throughout the several views.

Turning now to FIG. 1, this figure illustrates an ultrasound imaging and biomarker system 100, according to one or more aspects of the disclosed subject matter. The ultrasound imaging and biomarker system 100 comprises: at least one wearable medical device 101, a wireless access point 103, a user device 105, and an ultrasound imaging and biomarker analysis technology platform 121. The ultrasound imaging and biomarker analysis technology platform 121 may also be referred to herein as an artificial intelligence (AI)-powered ultrasound imaging technology system.

The at least one wearable medical device 101 may be customized to fit and monitor a target site 107 of a subject's body 109. For example, the wearable medical devices 101a, 101b, and 101c may be customized to fit and monitor target site 107a (e.g., the small of the back), target site 107b (e.g., the calf area), target site 107c (e.g., the chest). The wearable medical devices 101a, 101b, and 101c may be configured to capture ultrasound (US) images (e.g., sonomyography (SMG), echocardiography, doppler ultrasound, or the like) along with other physiological and motion parameters (e.g., surface electromyography (sEMG), ambulatory electrocardiogram (aECG), inertial measurement units (IMU) (motion), or the like). Physiological and motion parameters may also be referred to herein as biomarker data or biomarker parameters. Although examples are illustrated and described herein with regard to target areas 107a, 107b, and 107c, the wearable medical device 101 may be customized to fit and monitor any other target areas 107 of the subject's body 109 without departing from the spirit and scope of the present invention. The wearable medical devices 101a, 101b, and 101c and the target areas 107a, 107b, and 107c may be collectively or individually referred to herein as the wearable medical device(s) 101 and the target area(s) 107, respectively. The wearable medical device(s) 101 may also be referred to herein as wearable ultrasound and biomarker monitoring device(s), wearable ultrasound device(s), wearable monitoring device(s), and/or wearable scanning device(s).

The shape of the wearable medical device 101 is designed to conform with the anatomic location of the target site 107 of the subject's body 109 allowing for precision measurements to be made from the ultrasound and biomarker data captured during a monitoring session. According to some embodiments, the wearable medical device 101a may be designed with a customized adhesive patch and electrode array (e.g., 2-lead to 12-lead) to conform to the target site 107a (e.g., the small of the back) to capture IMU (motion), SMG, and sEMG data. In some embodiments, the wearable medical device 101b may be designed with a customized adhesive patch and electrode array (e.g., 2-lead to 12-lead) to conform to the target site 107b (e.g., the calf area) to capture US and sEMG data. In some embodiments, the wearable medical device 101c may be designed with a customized adhesive patch and electrode array (e.g., 3-lead) to conform to the target site 107c (e.g., the chest) to capture US and aECG data.

The wearable medical devices 101 wirelessly communicate via a local area network 111 and/or a body area network (BAN) to the user device 105 and/or the wireless access point 103, according to some embodiments. As such, the wearable medical device 101 is a portable ultrasound system that can be used for both static and moving images. It can be properly adapted to all body surfaces through different types of patches. As the wearable medical monitoring device 101 can be anchored to a flexible fabric adhesive patch (e.g., non-woven polyester) or anchored to clothing, there is no movement or displacement of the functional ultrasound components (e.g., ultrasound transducer, ultrasound sensors, ultrasound transceiver, or the like) during the image acquisition.

According to one or more aspects of the disclosed subject matter, two or more wireless medical devices 101 may be placed on the subject's body 109 and may act in concert with one another during operation. In some embodiments, the two or more wireless medical devices 101 may communicate via a personal area network (e.g., body area network, Bluetooth™, or the like). During operation, the two or more wireless medical devices 101 may perform a synchronization procedure to establish timing and control signaling with the user device 105 and/or the wireless access point 103. In some embodiments, each of the wireless medical devices 101 establish signaling and control with the user device 105 and/or the wireless access point 103. In other embodiments, the two or more wireless medical devices 101 establish a mesh network and/or a star network to transmit and receive signaling and control with the user device 105 and/or the wireless access point 103. In such embodiments, one of the wireless medical devices 101 acts as a body area gateway to communicate with the user device 105 and/or the wireless access point 103 and communications from the body area gateway device to and from the remaining wireless medical devices 101 propagates through the mesh network.

The wireless access point 103 may provide communications between the user device 105 and/or to a network server 113 over a wide area network 115 (e.g., the internet, a campus area network, a city area network, or the like). In some embodiments, the wireless access point 103 may communicate between one or more of the user device 105 and/or the wearable medical devices 101 and the network server 113 via a radio access network 117 (e.g., UMTS, 5G, or the like) interfacing the wide area network 115. However, the wireless access point 103 may also be configured to communicate to the user device 105 and/or the network server 113 via a wired and/or fiber optic network.

The user device 105 may be any user computing device (e.g., a computer (PC), laptop, smartphone, cellular phone, notebook computer, tablet, netbook, a personal digital assistant (PDA), or any other programmable electronic device capable of communicating with other devices via the local area network 111 and via the wide area network 115. The user device 105 can be operated by a user to monitor and interact with the wearable medical device 101 and/or the network server 113 as further described herein. For example, a user (e.g., qualified healthcare provider) can use the user device 105 to select their preferred settings and modes of operation of the wearable medical device 101 in the ultrasound imaging and biomarker system 100, as further described herein. In one embodiment, the user device 105 interacts with the ultrasound imaging and biomarker system 100 via a software application (e.g., a mobile application, web application, etc.) as further described herein.

In some embodiments, a first user device 105a may display data obtained from wearable medical devices 101 in a first format, for example a web browser, that is suitable to a desktop computer. The same or similar data may be displayed on a second user device 105b (e.g., smartphone) in a second format, for example a compressed cell phone video format (e.g., 3GPP, MPEG-4, RTSP, or the like). In some embodiments, the information displayed on the first user device 105a may be segmented into separate displays and formatted appropriately for display on the second user device 105b. The first user device 105a and the second user device 105b may be collectively referred to herein as the user device(s) 105.

According to some embodiments, an optional video camera 119 may be used to capture video of the subject 109 in real-time and in motion during a dynamic ultrasound imaging and biomarker monitoring of the ultrasound imaging and biomarker system 100. Real-time is used herein to mean real-time or near real-time such that delays due to electronic equipment, communication networks, and/or processing time are negligible. In some embodiments, the optional video camera 119 may be communicatively coupled to the user device 105 and/or access point 103 via a wireless connection. However, the optional video camera 119 may also be configured to communicate to the wireless access point 103, the user device 105, and/or the network server 113 via a wired and/or fiber optic network. The optional video camera 119 may be any type of camera capable of capturing and transmitting video and/or still images of the subject's body 109.

The ultrasound imaging and biomarker analysis technology platform 121 may be a software application and/or a hardware application residing in whole or in part on the network server 113, according to one or more aspects of the disclosed subject matter. In some of the embodiments, the software application and/or the hardware application resides in whole or in part on in the user device 105. In some of the embodiments, the software application and/or the hardware application resides in whole or in part in the wearable medical devices 101. In embodiments where part of the software application and/or the hardware application resides in the user device 105 and/or the wearable medical devices 101, these parts of the software application and/or the hardware application cooperate with one another and/or with the other parts of the software application and/or hardware application residing in the network server 113 over the wide area network 115. The separate parts of the software application and/or hardware applications may cooperate in a synchronous manner or in an asynchronous manner. In some embodiments, the wearable medical devices 101 may store information (e.g., in local memory) for upload to the network server 113 and/or for later analysis. In other embodiments, the wearable medical devices 101 may actively transmit data to one or more of the user devices 105 for storage of data (e.g., in local memory of the one or more user devices 105) for upload to the network server 113 and/or for later analysis. In still other embodiments, the wearable medical device 101 may actively transmit data to one or more of the user devices 105 for actively uploading some or all of the data to the network server 113 and/or the remote computer 1001 for storage of data (e.g., in local memory of one or more of the network server 113 and/or the remote computer 1001) and/or later analysis. The software application and/or a hardware application may reside on the first user device 105a (e.g., desktop computer), the second user device 105b (e.g., smartphone), the remote computer 1001 and/or the network server 113.

In some embodiments the ultrasound imaging and biomarker analysis technology platform 121 is a software-as-a-medical device (SaMD), when executed by circuitry of the network server 113, circuitry of the wearable medical device 101, and/or circuitry of the user device 105, utilizes an artificial intelligence engine (e.g., cloud-computing engine) to control processing of algorithms for the extraction of quantitative imaging biomarkers and advanced analysis of dynamic ultrasound images acquired by the wearable medical devices 101 to monitor the target site 107 of the subject in real-time. The ultrasound imaging and biomarker analysis technology platform 121, when executed by circuitry of the network server 113 and/or circuitry of the user device 105, causes the circuitry to generate advanced structured reports and display the dynamic ultrasound images with analysis data generated from the extracted quantitative imaging biomarkers and acquired ultrasound images. Examples of musculoskeletal (MSK) imaging biomarkers (e.g., muscle architecture parameters (MAP)) include but are not limited to muscle thickness, cross-sectional area, pennation angle, and fascicle length. As such, a qualified healthcare professional (QHP) can monitor in real-time the advanced analysis of the dynamic ultrasound images (e.g., SMG) along with physiological parameters (e.g., sEMG, aECG, IMUs or the like) of a subject during a test activity.

The network server 113 can represent one or more servers communicably coupled to the wearable medical devices 101 and/or the user device 105 via the wide area network 115. The network server 113 can be configured to perform various processing for the ultrasound imaging and biomarker system 100 as further described herein. Additionally, the network server 113 can represent a dedicated bank of servers, cloud-based processing, and/or a serverless computing system corresponding to a virtualized set of hardware resources.

The wide area network 115 can be a public network, such as the Internet, or a private network, such as an LAN or WAN network, or any combination thereof and can also include PSTN or ISDN sub-networks. The wide area network 115 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Figure 2:
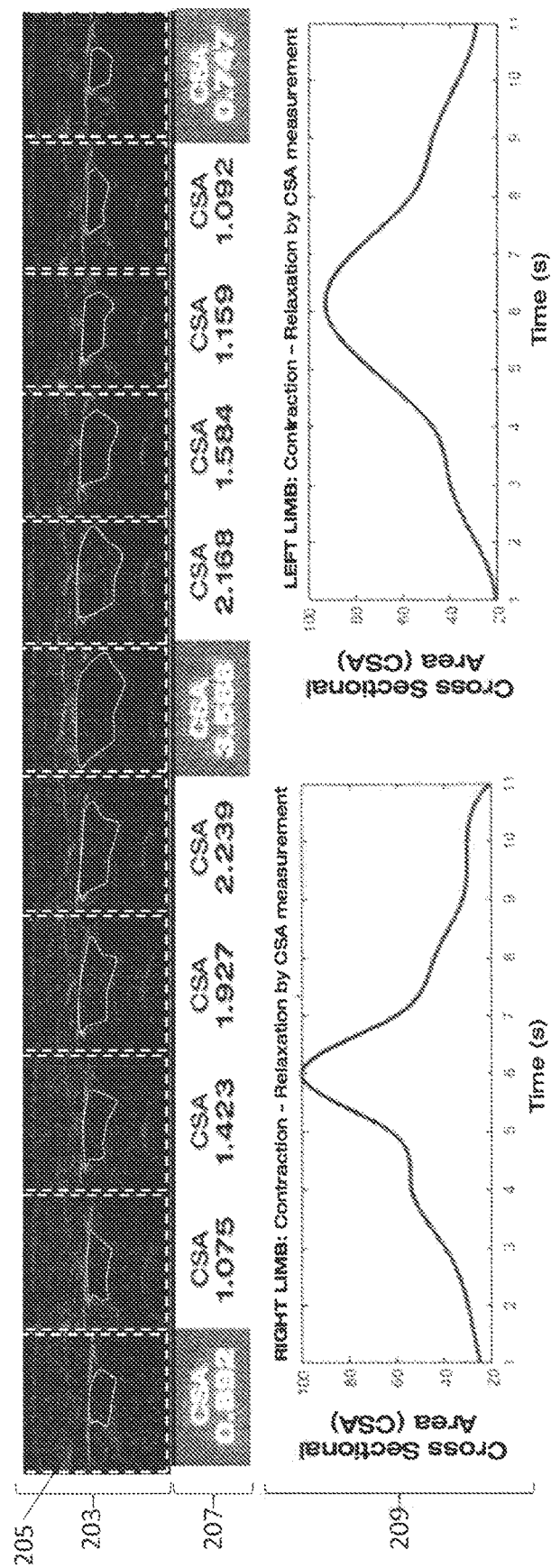
FIG. 2 illustrates a display of real-time dynamic ultrasound imaging data extracted from the ultrasound imaging and biomarker system, according to one or more aspects of the disclosed subject matter.

FIG. 2 illustrates a display of real-time dynamic ultrasound imaging data 200 extracted from the ultrasound imaging and biomarker system 100, according to one or more aspects of the disclosed subject matter. According to some embodiments, the real-time dynamic ultrasound imaging data 200 (e.g., sonomyography (SMG)) comprises: a series of dynamic ultrasound images 203, a series of analytical data values 207, and/or one or more analytical graphs 209. The series of dynamic ultrasound images 203 show how the muscle changes while performing a movement (e.g., test activity, test squat, exercise). For example, gastrocnemius contractions and relaxations may be viewed in real-time or near-real-time during the movement.

During the test activity, the wearable medical device 101 captures ultrasound images 203 and biomarker data from the target site 107 in real-time during the test activity (e.g., test squats) performed by the subject wearing the wearable medical device 101. According to one or more aspects of the disclosed subject matter, the wearable medical device 101 is equipped with bio-signal sensing devices (e.g., sEMG, aECG, or the like) along with precision sensing and motion detectors (e.g., IMU (motion), accelerometer, gyroscope, microelectromechanical systems (MEMS), or the like). In some embodiments, the bio-signal sensing devices and precision sensing and motion detectors are utilized by the ultrasound imaging and biomarker system 100 to trigger acquisition of the images and bio-signals of the target site 107 simultaneously during active motion of the subject's body 109.

The captured ultrasound images 203 and biomarker data is transmitted to the user device 105 and/or the network server 113 for analysis by the ultrasound imaging and biomarker analysis technology platform 121. According to some embodiments, the ultrasound imaging and biomarker analysis technology platform 121 generates overlays 205 for the dynamic ultrasound images 203, calculates the analytical data values 207 associated with the overlays 205 (e.g., cross-sectional area (CSA)), and generates the dynamic ultrasound images 203 with overlays 205 and the analytical data values 207 corresponding to each of the captured images. As such, the ultrasound images 203 of the subject may be monitored and analyzed in real-time by the qualified healthcare provider during the test activity. In some embodiments, the analytical graphs 209 (e.g., contraction-relaxation by CSA measurement vs time) may be produced in association with the analytical data values 207. For example, the cross-sectional area of the overlays 205 may be graphed in real-time and in association with the timing of the analytical data values 207 to show contraction-relaxation correlated with the overlays 205, dynamic ultrasound images 203, and the relative position of the subject's body 109 during the test activity.

According to some embodiments, a first series of the dynamic ultrasound images 203, overlays 205, analytical data values 207 and a first analytical graph 209 may be produced and displayed with a second series of the dynamic ultrasound images 203, overlays 205, analytical data values 207 and a second analytical graph 209. The first series of the dynamic ultrasound images 203 may be associated with a first wearable medical device 101 attached to a first target site 107b (e.g., right calf) of the subject's body 109 and the second series of the dynamic ultrasound images 203 may be associated with a second wearable medical device 101 attached to a second target site 107b (e.g., left calf) of the subject's body 109. As such, the dynamic ultrasound images 203, overlays 205, analytical data values 207 and analytical graphs 209 of more than one target site 107 of the subject's body 109 may be monitored coincidently and in real-time.

According to one or more aspects of the disclosed subject matter, image analysis algorithms for automatic segmentation of the dynamic ultrasound images 203 are performed by the ultrasound imaging and biomarker analysis technology platform 121. The ultrasound imaging and biomarker analysis technology platform 121 performs an optimized automatic pipeline of processing modules to provide an advanced image processing using a retrospective dataset of ultrasound images of a target site 107 (e.g., thigh muscles). According to some embodiments, the processing modules include but are not limited to image acquisition, image processing (RD), image analysis, calculating measurements, and structured reporting.

During automatic segmentation, a convolutional neural network together with several algorithms may be applied by the ultrasound imaging and biomarker analysis technology platform 121 in accordance with some embodiments. For example, to detect the aponeurosis, the convolutional network returns the predictions in the form of masks overlayed on the raw image. Heuristic algorithms are applied to improve the final result (e.g. skeletonization is performed to refine the heuristics and make a single-node route) Once the aponeuroses have been detected and labelled, algorithms are applied on this image to calculate different biomarkers that are included in the muscle architecture parameters (MAP), for example, subcutaneous fat or muscle thickness may be shown on the user device 105. As such, the ultrasound imaging and biomarker analysis technology platform 121 provides for a cloud-computing and AI-based system for the advanced analysis of quantitative ultrasound imaging biomarkers along with other physiological parameters that are compatible and interoperable with the DICOM medical imaging standards.

According to some embodiments, the ultrasound imaging and biomarker analysis technology platform 121 may display one or more of the images obtained from the raw image (e.g., a background separated ultrasound image, a threshold ultrasound image, an aponeuroses path search image, a skeletonize path search image, and/or a labeled image). According to one or more aspects of the disclosed subject matter, the ultrasound imaging and biomarker analysis technology platform 121 is implemented based on Deep Learning models and Deep Neural Networks (DNN) technology which allow for analysis of multi-variate imaging biomarkers extracted from automatic processing of the ultrasound imaging, classifications to be performed, prognostic estimation, and monitoring of treatment efficacy and progression for personalized medical decision support (e.g., Clinical Decision Support System).

Structured reports may also be generated by the ultrasound imaging and biomarker analysis technology platform 121, in accordance with one or more aspects of the disclosed subject matter. In some embodiments, a user (e.g., qualified healthcare provider) may connect to the ultrasound imaging and biomarker analysis technology platform 121, create a study, and upload the acquired images. The images will be processed and quantified with the ultrasound imaging and biomarker analysis technology platform 121 (e.g., convolutional neural networks) and develop algorithms to extract several image biomarkers, which will then be related in a structured report so that the health professionals can evaluate the results. The structured report may include one or more of a patient profile section, a target area indicator, a muscle architecture parameter (MAP) and index section, and a muscle quality index section according to some embodiments. The patient profile section comprises profile information (e.g., patient id, patient, name, weight, height, gender, ethnicity, birthdate, responsible party, study id, and study date). The target area indicator specifies a target site 107 (e.g., longitudinal right medial gastrocnemius) of the subject's body 109 used during the test activity. The MAP and index section comprises a plurality of MAP parameters utilized by the wearable medical device 101 to obtain the dynamic ultrasound images 203 from the target site 107 and measurements calculated by the ultrasound imaging and biomarker analysis technology platform 121 during the test activity. The plurality of MAP parameters and calculated measurements are reported for a plurality of phases (e.g., ten phases) of the test activity. According to some embodiments, the MAP parameters include but are not limited to: pennation angle, cos α, muscle fiber length, muscle thickness, subcutaneous fat thickness, muscle strength (Fm) (e.g., estimate of the maximum isometric force), force transmitted to the tendon (Ft) (e.g., estimate of the force transmitted to the tendon), muscle to no muscle index (Mi), No muscle to muscle index (NMi), fat to muscle index (FATi), and no muscle/no fat to muscle index (NMNFi). According to some embodiments, the muscle quality index section comprises pie charts illustrating the percentages of muscle to no muscle index (Mi), fat to muscle index (FATi), and no muscle/no fat to muscle index (NMNFi) for each of the plurality of phases (e.g., ten phases). However, any suitable structured reports may be generated by the ultrasound imaging and biomarker analysis technology platform 121. For example, the ultrasound imaging and biomarker analysis technology platform 121 can be used to analyze ultrasound images of different muscles acquired in the same study used for analyzing the moving images discussed above. As such, the qualified healthcare professional can evaluate the combined results shown in the structured report.

FIGS. 3A, 3B, and 3C, illustrate a perspective view, an exploded view, and a magnified view, respectively, of the wearable medical device 101 according to one or more aspects of the disclosed subject matter. The wearable medical device 101 comprises a scanning and monitoring module 501, an adhesive electrode patch 503, an electrode array comprising a first electrode 505, a second electrode 507, and a third electrode 509, according to some embodiments.

As shown in FIG. 3B, the scanning and monitoring module 501 is releasably attachable to the adhesive electrode patch 503 by a rotary coupling member 511 according to one or more aspects of the disclosed subject matter. The rotary coupling member 511 and the scanning and monitoring module 501 may be adapted with cooperating snap-to-fit configurations 513, according to some embodiments. However, other suitable configurations (e.g., threaded fittings) may be used as long as the scanning and monitoring module 501 is releasably attachable to the adhesive electrode patch 503. The scanning and monitoring module 501 may be referred to herein as an ultrasound scanner, wireless scanning device, and/or ultrasound module.

When attached to the rotary coupling member 511, as shown in FIG. 3A, the scanning and monitoring module 501 is able to rotate about a Z-axis as indicated by the directional arrows 515. According to one or more aspects of the disclosed subject matter, the scanning and monitoring module 501 may rotate through a rotation angle which allows for both longitudinal and transverse imaging. According to some embodiments, the rotation angle may be an angle between 0 degrees and 90 degrees (±20 degrees). In some embodiments, the scanning and monitoring module 501 may be configured to rotate a full 360 degrees.

In some embodiments, the scanning and monitoring module 501 is able to tilt away from the Z-axis as indicated by tilting angle α as shown in FIG. 3A. In such embodiments, tilting the scanning and monitoring module 501 aids in the location and/or focus on a region of interest (ROI) in the target site 107. According to some embodiments, the tilting angle α may be an angle between 0 degrees and 45 degrees (±5 degrees).

The rotary coupling member 511 further comprises a bio-signal rotary connection 517 arranged within a channel 519 of the rotary coupling member 511. In some embodiments, the bio-signal rotary connection 517 may be integrally formed and/or embedded within the channel 519. In other embodiments, the bio-signal rotary connection 517 is detachable from the rotary coupling member 511.

FIG. 3C illustrates a magnified view of the rotary coupling member 511, in accordance with one or more aspects of the disclosed subject matter. FIG. 3C illustrates the bio-signal rotary connection 517 seated in the channel 519 of the rotary coupling member 511 in accordance with some embodiments. According to some embodiments, the bio-signal rotary connection 517 is a printed circuit board (PCB) comprising a non-conductive substrate 521 (e.g., insulative substrate, polyamide material layer, glass fiber reinforced epoxy resin (FR-4), or the like) and conductive tracks 523 (e.g., patterned metal traces, patterned copper foil, conductive lines, circuit traces, or the like). FIG. 3C further illustrates a rotation angle θ which is limited by the lengths of the conductive tracks 523 exposed on the top of the bio-signal rotary connection 517, in accordance with one or more aspects of the disclosed subject matter. In some embodiments, the conductive tracks 523 may be configured such that the rotation angle θ is limited to an angle between 0 degrees and 90 degrees (±20 degrees) but is sufficient to accommodate rotation of the scanning and monitoring module 501 for both longitudinal and transverse imaging. However, any suitable rotation angle θ may be used. In some embodiments, the conductive tracks 523 may be configured in a full circle or nearly a full circle allowing for the scanning and monitoring module 501 to rotate a full 360 degrees or nearly 360 degrees. FIG. 3C further illustrates a magnified view of the snap-to-fit configurations 513 of the rotary coupling member 511.

According to one or more aspects of the disclosed subject matter, a full rotation of the scanning and monitoring module 501 allows for the ultrasound imaging to capture a full 3D scan of the target site 107. In some embodiments, a convex transducer is used with the scanning and monitoring module 501. In such embodiments, the resulting 3D images will be in a conical shape. In other embodiments, a flat transducer may be utilized with the scanning and monitoring module 501. In such embodiments, the resulting 3D images will be in a cylinder shape.

In accordance with some aspects of the disclosed subject matter, the scanning and monitoring module 501 and/or the ultrasound transducer may be tilted about an axis at the transduce surface to aid in the location and/or focus on a region of interest (ROI) in the target site 107. In such embodiments, a fan of planes is acquired and the angular separation between images is adjustable, which depends on the rotational speed and the image frame rate.

When attached, the bio-signal rotary connection 517 electrically connects the electrode array of the first electrode 505, the second electrode 507, and the third electrode 509 to the scanning and monitoring module 501 and maintains the electrical connection therebetween during rotation of the scanning and monitoring module 501. According to some embodiments, the scanning and monitoring module 501 is rotated and/or a tilting angle is adjusted manually by a qualified healthcare professional to obtain an appropriate cutting plane for the ultrasound images 203 to be obtained. In other embodiments, the rotation of the scanning and monitoring module 501 and/or the tilting angle may be achieved automatically by the ultrasound imaging and biomarker system 100 controlling a MEMs device (e.g., a rotary motor, a linear motor, a servo motor, or the like) incorporated into the scanning and monitoring module 501 and/or incorporated into the rotary coupling member 511. However, any suitable rotation actuator and/or tilting mechanism may be used as long as the electrical connection between the electrodes and the scanning and monitoring module 501 is maintained during rotation and/or tilting.

According to one or more aspects of the disclosed subject matter, simultaneous acquisitions of the ultrasound images 203 and/or bio-signals can be achieved by the scanning and monitoring module 501 at an angle of rotation and/or at a tilting angle for capturing images along a predetermined cutting plane (e.g., longitudinal cutting plane, longitudinal cutting plane, or the like). However, any suitable angle of rotation and/or tilting angle for capturing images along a predetermined cutting plane may be utilized. The predetermined angles of rotation, tilting angles, and predetermined cutting planes can be determined by a qualified professional or by a machine determinations (e.g., thresholds, algorithms, machine learning, automated intelligence (AI), or the like).

In some embodiments, the ultrasound images 203 and/or bio-signals can be acquired simultaneously during rotation of the scanning and monitoring module 501 and/or while the scanning and monitoring module 501 is at rest. Furthermore, the scanning and monitoring module 501 and/or user device 105 may be configured to determine one or more optimum angles of rotation for acquiring the ultrasound images 203 and/or bio-signals.

In accordance with some embodiments, a determined optimum angle of rotation and/or optimum tilting angles may have a tolerance range of less than a predetermined amount from the angle of a predetermined cutting plane. For example, a tolerance range of less that about ±_0.5 degrees From the angle of the predetermined cutting plane may be used for measuring penation angles. In more basic imaging applications, a tolerance range of less than about ±2.5 to about ±5.0 degrees From the angle of the predetermined cutting plane may be used. When a manual adjustment of the scanning and monitoring module 501 is used, a tolerance range of less than about ±20 degrees From the angle of the predetermined cutting plane may be used. Nevertheless, any suitable tolerance range may be utilized based on the predetermined target site 107 and a predetermined cutting plane accuracy.

The one or more optimum angles of rotation and/or the optimum tilting angles may be determined by a skilled person (e.g., physiotherapist). In some embodiments, the rotation of the scanning and monitoring module 501 may be incrementally adjusted degree by degree. However, any suitable incremental adjustment (e.g., 5 degree increments, 10 degree increments, or the like) can be utilized in placement of the scanning and monitoring module 501. According to one or more aspects of the disclosed subject matter, the biomarkers extracted by the ultrasound imaging and biomarker analysis technology platform 121 may be used to assist in the determination of the one or more optimum angles of rotation and/or optimum tilting angles. In such embodiments, the ultrasound imaging and biomarker analysis technology platform 121 utilizes one or more of the scanning and monitoring module 501, the user devices 105, and/or network server 113 resources to develop algorithms in the determination of the one or more optimum angles of rotation. In some embodiments, artificial intelligence technologies (e.g., convolutional neural networks) may be used to determine the one or more optimum angles of rotation.

According to some embodiments, logic, accelerometers, gyroscopes, and/or object recognition, of the scanning and monitoring module 501, the user devices 105, and/or the optional camera 119 may be used to determine an angle of rotation of the scanning and monitoring module 501 in relation to an optimum angle of rotation. In one or more aspects of the disclosed subject matter, the wearable medical device 101 and/or the user devices 105 comprise an optimum angle indicator that is activated when the scanning and monitoring module 501 has been rotated to a determined optimum angle of rotation. The optimum angle indicator may be a visual indicator (e.g., a light emitting diode (LED)), an audible indicator (e.g., a chime, a verbal cue, a ring tone, or the like), a haptic indicator (e.g., vibration), a textual indicator (e.g., on-screen notification, pop-up notification, icon, or the like), combinations thereof, or the like. However, any other suitable indicators may be used.

Figure 4:
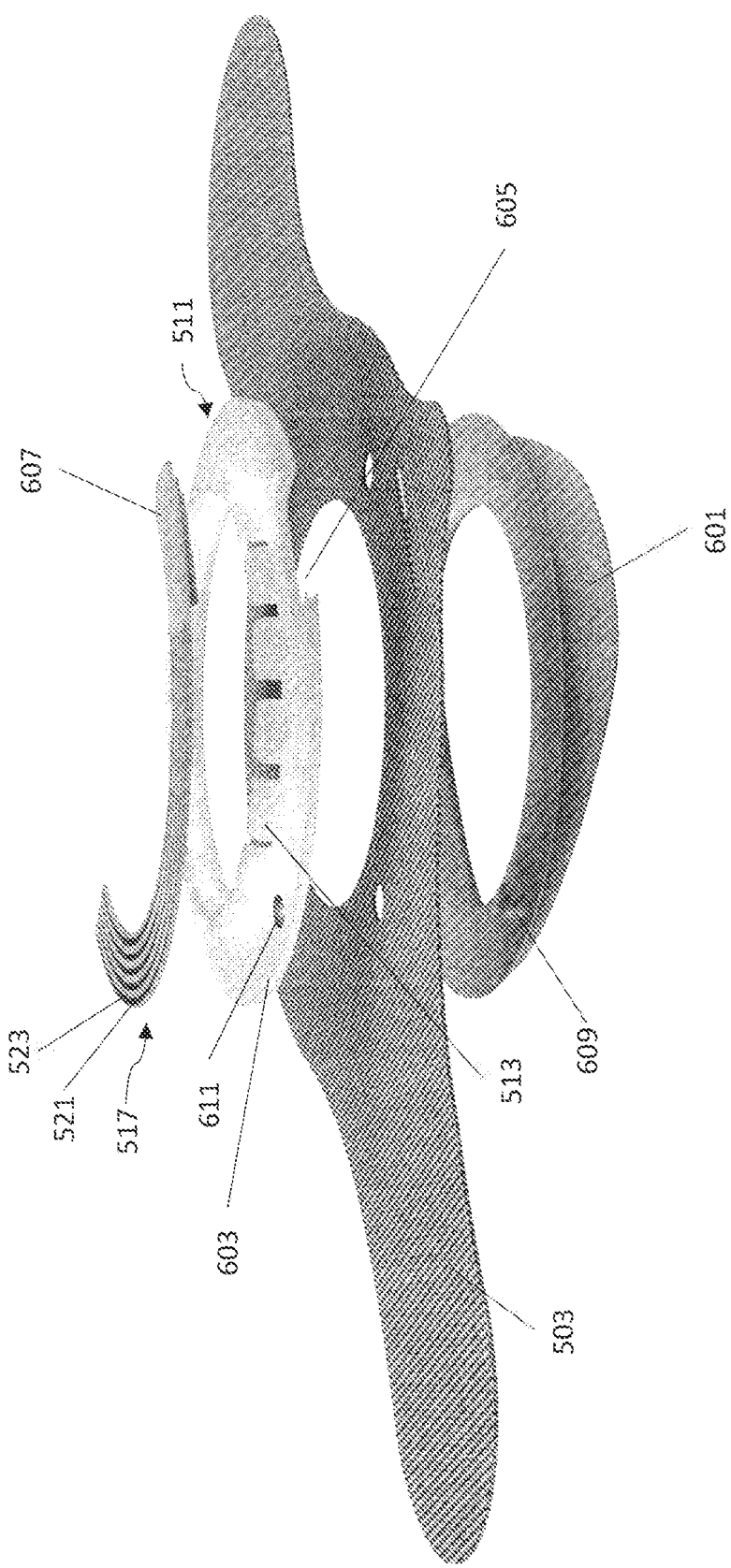
FIG. 4 illustrates an exploded view of the rotary coupling member and a surface mount adapter according to one or more aspects of the disclosed subject matter.

Turning now to FIG. 4, this figure illustrates an exploded view of the rotary coupling member 511 and a surface mount adapter 601 according to one or more aspects of the disclosed subject matter. The rotary coupling member 511 illustrated in FIG. 4 is similar to the rotary coupling member 511 illustrated in FIGS. 3B and 3C except the rotary coupling member 511 in FIG. 4 comprises a lip 603 instead of the channel 519 shown in FIGS. 3B and 3C. The bio-signal rotary connection 517 illustrated in FIG. 4 is secured to the rotary coupling member 511 via a tab-and-slot configuration, in accordance with some embodiments. According to some embodiments, the lip 603 of the rotary coupling member 511 comprises a slot 605 and the bio-signal rotary connection 517 comprises a tab 607 adapted to fit into the slot 605 securing the bio-signal rotary connection 517 to the rotary coupling member 511. According to some embodiments, the conductive tracks 523 are electrically coupled through the non-conductive substrate 521 to external contacts on the bottom side of the bio-signal rotary connection 517. In one or more aspects of the disclosed subject matter, the external contacts are exposed on the bottom side of the tab 607. However, any suitable location may be used for the external contacts.

The surface mount adapter 601 is adapted to connect to the bottom side of the rotary coupling member 511 with the adhesive electrode patch 503 sandwiched in between, in accordance with some embodiments. The surface mount adapter 601 and the rotary coupling member 511 are adapted with cooperating snap-to-fit features, in accordance with one or more aspects of the disclosed subject matter. In some embodiments, the surface mount adapter 601 comprises raised tabs 609 that fit snugly into holes 611 of the rotary coupling member 511. In other embodiments, the surface mount adapter 601 comprises the holes 611 and the rotary coupling member 511 comprises the raised tabs 609 that fit snugly into the holes 611. Still other snap-to-fit and/or other connecting features may be utilized to secure the surface mount adapter 601 to the rotary coupling member 511 according to one or more aspects of the disclosed subject matter. As such, the upper surface of the surface mount adapter 601 fits flush with the bottom surface of the rotary coupling member 511. The surface mount adapter 601 is formed of a resilient material (e.g., resilient adhesive pad, a biocompatible adhesive silicone-gel, biocompatible adhesives, biocompatible ionic gels, soft silicone adhesives (SSA), silicone gel elastomers, solid silicon, or the like) with a bottom surface that can be formed in any size and shape to conform and fit to any target site 107 of the subject's body 109 (e.g., 107a, 107b, 107c), in accordance with one or more aspects of the disclosed subject matter. As illustrated in FIG. 4, the surface mount adapter 601 may be formed in a size and shape to conform and fit to the target site area 107a of the subject's body 109 (e.g., the small of the back).

Figure 5B:
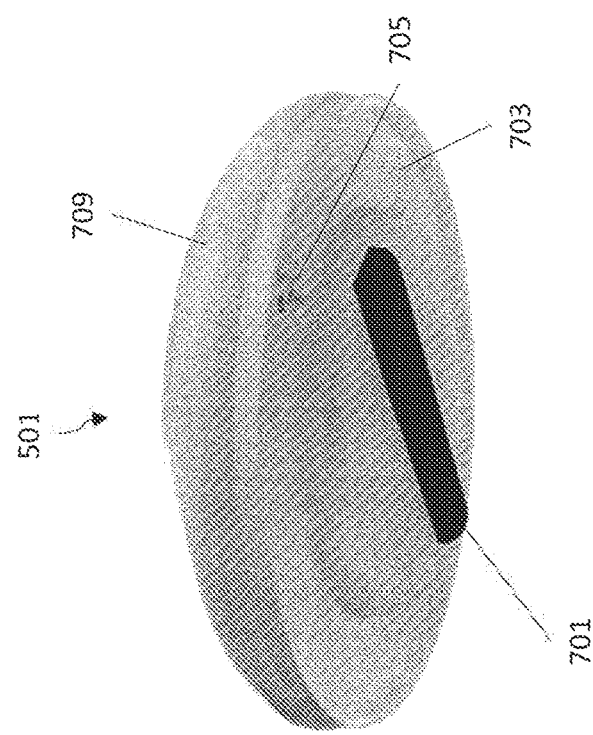
FIGS. 5A and 5B illustrate an exploded view and a perspective view, respectively, of a scanning and monitoring module according to one or more aspects of the disclosed subject matter.
Figure 5A:
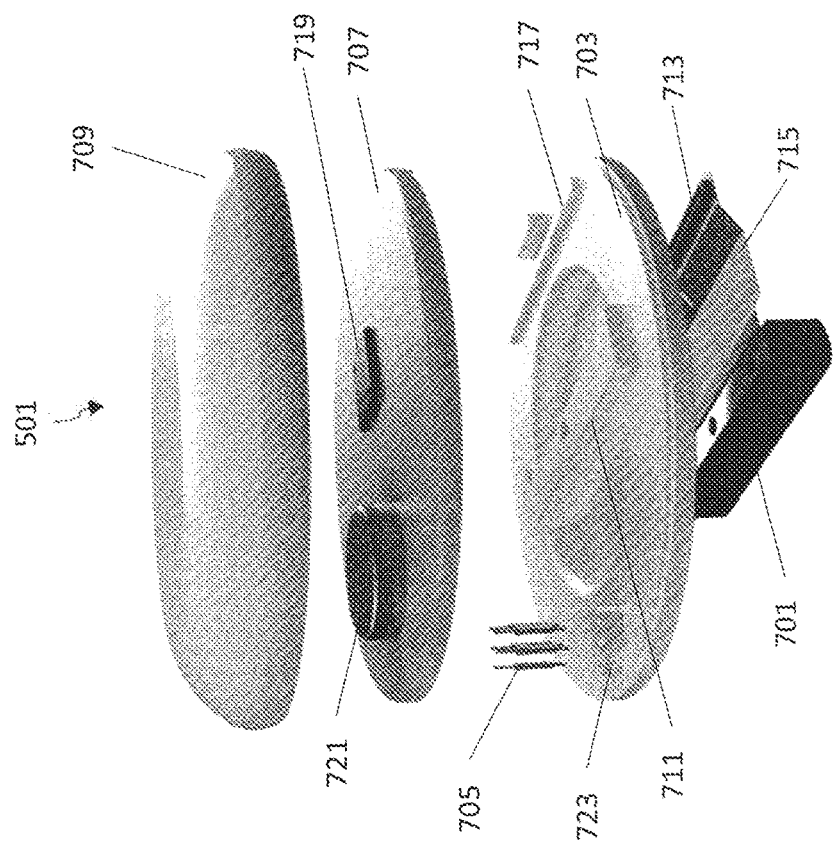

FIGS. 5A and 5B illustrate an exploded view and a perspective view, respectively, of the scanning and monitoring module 501 according to one or more aspects of the disclosed subject matter. The scanning and monitoring module 501 is configured for obtaining at least one ultrasound image 203 of a target site 107 of a user's body 109 on which the scanning and monitoring module 501 is positioned. According to some embodiments, the scanning and monitoring module 501 comprises an ultrasound transducer 701, a lower housing 703, conductive contacts 705, a printed circuit board (PCB) 707, and an upper housing 709, according to some embodiments.

According to one or more aspects of the disclosed subject matter, the ultrasound transducer 701 is based on highly active piezoelectric or capacitive micromachined ultrasonic transducers (CMUT) sensor array for obtaining ultrasound images of the target site 107. Such an ultrasound transducer 701 is described in international patent application PCT/EP2021/051377 and is incorporated herein by reference.

In accordance with one or more aspects of the disclosed subject matter, the ultrasound transducer 701 is intended to operate in the range of 7-14 MHz for superficial scans and 2-6 MHz for deeper targets. However, in further embodiments, the ultrasound transducer 701 may operate in any other range, now known or later developed, capable of allowing the scanning and monitoring module 501 to substantially carry out the functionality described herein. Additionally, in at least one embodiment, the ultrasound transducer 701 is configured for operating in a pulse-echo configuration. For example, the ultrasound transducer 701 is configured to emit and subsequently receive ultrasonic pulses in order to obtain the ultrasound image 203. In at least one embodiment, the ultrasound transducer 701 comprises one or more piezoelectric elements. In at least one such embodiment, the ultrasound transducer 701 comprises an array of piezoelectric elements, with the quantity of piezoelectric elements in the array ranging between 2 and 256. However, in further embodiments, any other quantities of piezoelectric elements may be utilized.

In some embodiments, the ultrasound transducer 701 provides an acoustic lens to shift a focal length of the ultrasound transducer 701 and increase the acoustic energy density at predetermined positions (improving the imaging resolution on that region). The shifting of the focal length, the increasing of the acoustic energy density, and the predetermined positions can be determined by a qualified professional or by a machine determinations (e.g., thresholds, algorithms, machine learning, automated intelligence (AI), or the like). For the case of a flexible and conformal ultrasound transducer 701, the use of lenses may be exploited to control the propagation of acoustic waves according to the specific geometry of the target site. In at least one embodiment, the acoustic lens is constructed from at least one of: a room temperature vulcanizing (RTV) rubber, a polyurethane, a plexiglass, a silicone rubber, a polystyrene, and an epoxy. However, the acoustic lens may be constructed out of any other material (or combinations of materials) now known or later developed, so long as the scanning and monitoring module 501 is capable of substantially carrying out the functionality described herein.

In some embodiments, the ultrasound transducer 701 is provided with an acoustic standoff pad (e.g., gel pad, probe standoff, or the like). The acoustic standoff pads help to improve the transmission of acoustic energy in a similar manner as the acoustic lens and allow for the capture of high-quality images. The acoustic standoff pads comprise a gel material (e.g., a flexible polymer) that is comfortable for the patient during exams, is long lasting, and can be reused.

According to some embodiments, the ultrasound transducer 701 is mounted to a retaining slot 711 of the lower housing 703 and is physically and electrically coupled to a ribbon cable connector 713 via a ribbon cable 715. The ribbon cable connector 713 connects the ultrasound transducer 701 to the printed circuit board (PCB) 707 and is supported by a raised feature 717 of the lower housing 703.

The conductive contacts 705 are secured within a pin mounting structure 723 of the lower housing 703 and protrude from a bottom surface of the lower housing 703 and electrically connect to the printed circuit board (PCB) 707 according to one or more aspects of the disclosed subject matter. In some embodiments, the conductive contacts 705 are provided as POGO pin connectors, spring loaded pin connectors, or the like.

At the outset, it should be noted that the particular arrangement of components is illustrated in FIGS. 5A and 5B are merely exemplary. Thus, in further embodiments, as discussed further below, the various components may take on a number of other arrangements.

Figure 6:
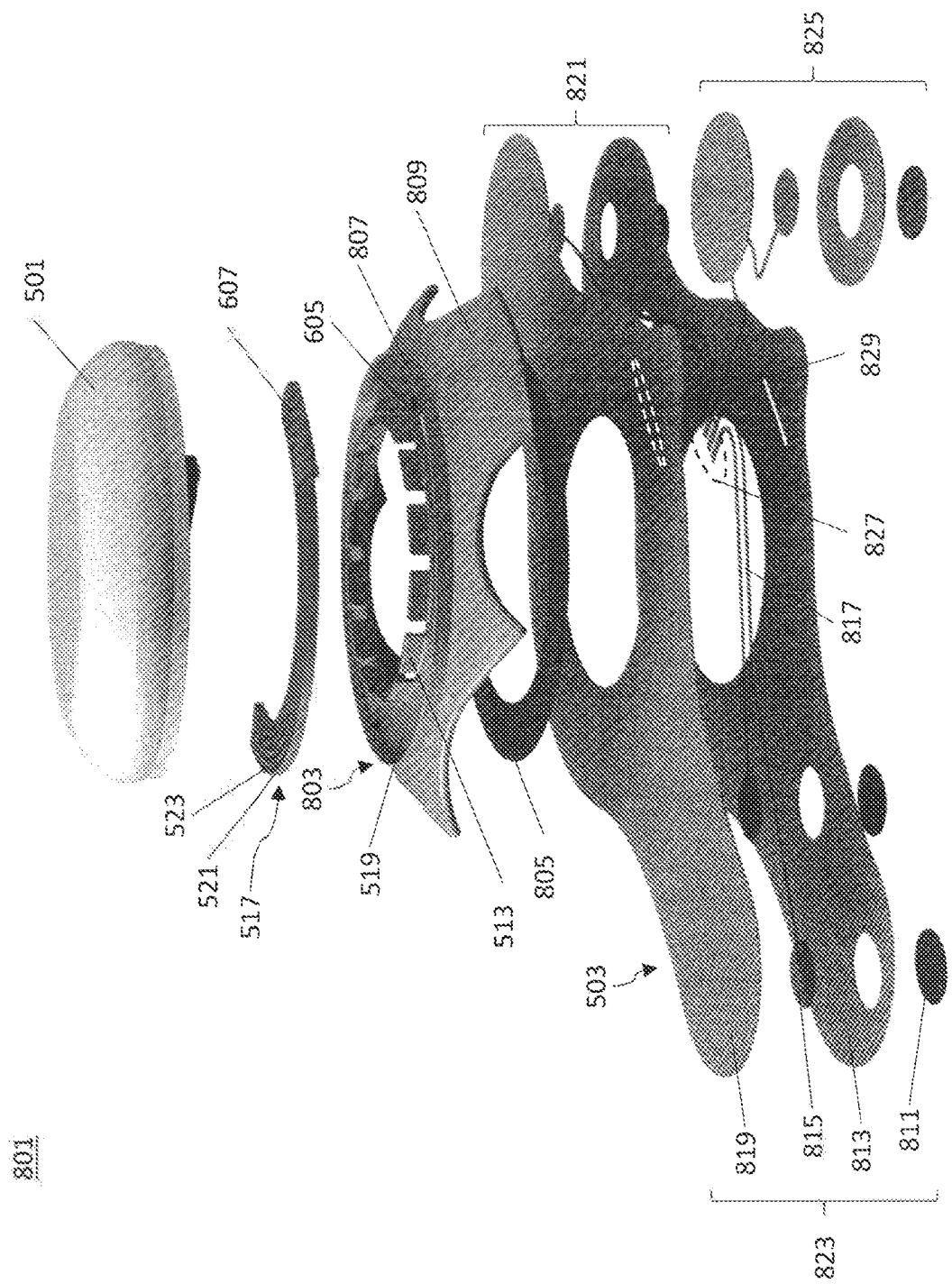
FIG. 6 illustrates an exploded view of a wearable medical device according to one or more aspects of the disclosed subject matter.

FIG. 6 illustrates an exploded view of a second wearable ultrasound and biomarker monitoring device 801 according to one or more aspects of the disclosed subject matter. The second wearable ultrasound and biomarker monitoring device 801 comprises the scanning and monitoring module 501, the bio-signal rotary connection 517, an integrated rotary coupling member and surface mount adapter 803, a double sided adhesive 805, and the adhesive electrode patch 503.

The bio-signal rotary connection 517 fits within the channel 519 and attaches to the integrated rotary coupling member and surface mount adapter 803 using the slot 605 and tab 607 in a snap-to-fit configuration according to one or more aspects of the disclosed subject matter. However, other configurations are also possible including integrally forming and/or embedding the bio-signal rotary connection 517 in the channel 519 of the integrated rotary coupling member and surface mount adapter 803.

The integrated rotary coupling and surface mount adapter 803 is an integrally formed component comprising a rotary coupling section 807 and a surface mount section 809. The rotary coupling section 807 is similar to the rotary coupling member 511, as described herein; however, the rotary coupling section 807 is not detachable from surface mount section 809.

The surface mount section 809 is similar to the surface mount adapter 601 as described herein; however, the surface mount section 809 is not detachable from the rotary coupling section 807. The surface mount section 809 can be formed in any size and shape to conform and fit to any target site area 107 of a subject's body 109 (e.g., 107a, 107b, 107c). As illustrated in FIG. 6, the surface mount section 809 may be formed in a size and shape to conform and fit to the target site area 107b of the subject's body 109 (e.g., the calf area), according to some embodiments. Although, the surface mount section 809 may also have the same shape as the surface mount adapter 601, according to one or more aspects of the disclosed subject matter.

The double-sided adhesive layer 805 allows for releasable attachment of the integrated rotary coupling and surface mount adapter 803 to the adhesive electrode patch 503 according to some aspects of the disclosed subject matter. The double-sided adhesive layer 805 may be an adhesive film (e.g., a tape-based adhesive, nanofilm, flexible and stretchable film-based adhesive, pressure-sensitive adhesive film, biomedical adhesive, or the like). However, any suitable adhesive (e.g., liquid, paste, or the like) may be utilized for the double-sided adhesive layer 805 without departing from the spirit and scope of the disclosed subject matter.

The adhesive electrode patch 503 comprises conductive adhesive pads 811, a bottom patch 813, electrode pads 815, electrode trace array 817, and a top patch 819, according to one or more aspects of the disclosed subject matter. The adhesive electrode patch 503 may be formed with two or more electrode sites (e.g., for example, a first electrode site 821, a second electrode site 823, and a third electrode site 825). In the embodiment illustrated in FIG. 6, there are five electrode sites. However, any suitable number of electrode sites may be utilized.

Each of the conductive adhesive pads 811 attach a corresponding electrode pad 815 to a predetermined electrode site on the subject's body 109. According to some embodiments, the conductive adhesive pads 811 comprise an electrically conductive adhesive film (e.g., electrically conductive film, electrically conductive pressure-sensitive adhesive, conductive ink printed on polyimide film, or the like); however, any suitable conductive adhesive may be utilized.

Each electrode pad 815 is connected by an electrode trace 817 to a connection site 827 for electrical connection to the overlying scanning and monitoring module 501. The electrode traces 817 may be collectively referred to herein as an electrode array. In some embodiments, the connection sites 827 are located adjacent to one another in a common connection site, as illustrated in FIG. 6. However, the electrode traces 817 may have connection sites 827 in different locations that are not commonly located but are still located in sites accessible for connection to the overlying scanning and monitoring module 501. According to some embodiments, the electrode pads 815 and the electrode traces 817 comprise an electrically conductive material (e.g., printed silver chloride conductive ink, nanosilver based ink, conductive pattern, stamped metal sheet, conductive film, metal nanoplate, conductive film, printed on polyimide film, metal wire, or the like). However, any suitable electrically conductive material can be used.

The electrode array is sandwiched between the bottom patch 813 and the top patch 819 according to some aspects of the disclosed subject matter. In some embodiments, the electrode pads 815 and the electrode traces 817 are printed on one of the bottom patch 813 or the top patch 819. In such an embodiment, the electrode pads 815 and the electrode traces 817 may comprise a printable conductive ink (e.g., printed silver chloride conductive ink). In some embodiments, each of the bottom patch 813 and the top patch 819 are provided as undivided material patches. In such embodiments, when sandwiched between the bottom patch 813 and the top patch 819, the electrode traces 817 are fully concealed except at the connection sites 827. In other embodiments, a portion of one or more of the electrode traces 817 may not be concealed when sandwiched between the bottom patch 813 and the top patch 819. For example, a portion of the electrode trace 817 corresponding to the third electrode 825 in FIG. 6 is not concealed by the bottom patch 813 and the top patch 819. In such embodiments, each of the bottom patch 813 and the top patch 819 may be provided as a group of material patches. These groups of material patches may comprise a main body of material and one or more secondary bodies of material. The main body of material conceals at least the portions of each electrode trace 817 near the connection sites 827 when the electrode array is sandwiched between the bottom patch 813 and the top patch 819. The one or more secondary bodies of material sandwiches one or more of the electrode pads 815 between the bottom patch 813 and the top patch 819 and leaves portions of the corresponding electrode trace(s) 817 exposed. In such embodiments, the corresponding trace(s) 817 may be provided with a dielectric cladding or sheath surrounding the exposed portions the corresponding trace(s) 817.

According to some embodiments, one or more connection site access areas 829 may be provided in the top patch 819 corresponding to the connection sites 827 to allow for electrical connection of the electrode traces 817 to the overlying scanning and monitoring module 501. In some aspects of the disclosed subject matter, the bio-signal rotary connection 517 comprises external contacts exposed on the bottom side of the bio-signal rotary connection 517 for external connection to the conductive tracks 523 on the top side of the bio-signal rotary connection 517. For example, the external contacts are electrically connected through the tab 607 to the conductive tracks 523 for external connection to the bottom side of the bio-signal rotary connection 517. As such, the portions of the electrode traces 817 that are exposed through the connection site access areas 829 electrically connect to the external contacts exposed at the bottom of the bio-signal rotary connection 517 when the electrode array is sandwiched between the top patch 819 and the bottom patch 813 forming the adhesive electrode patch 503 and the integrated rotary coupling and surface mount adapter 803 is attached to the adhesive electrode patch 503. However, any suitable arrangement of conductive contacts and/or connectors may be provided at the bottom of the scanning and monitoring module 501 and/or the integrated rotary coupling and surface mount adapter 803 to allow electrical connection of the electrode traces 817 to the scanning and monitoring module 501.

Figure 7:
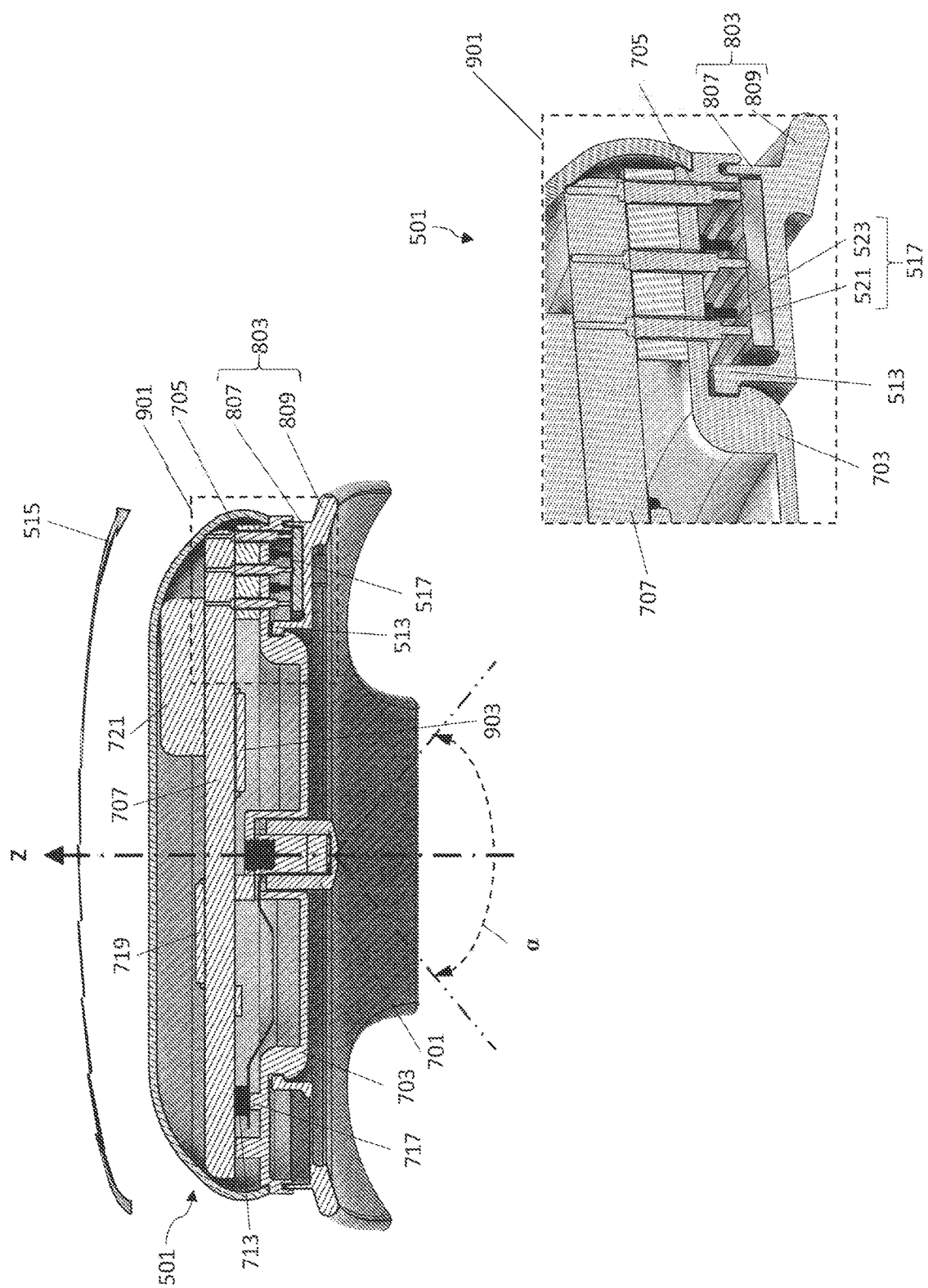
FIG. 7 illustrates a cross-sectional view and magnified section of a scanning and monitoring module, a rotary coupling, and skin adapter according to one or more aspects of the disclosed subject matter.

Turning now to FIG. 7, this figure illustrates a cross-sectional view and a magnified view of a section 901 of the second wearable ultrasound and biomarker monitoring device 801, in accordance with one or more aspects of the disclosed subject matter. In particular, FIG. 7 illustrates the bio-signal rotary connection 517 mounted to the integrated rotary coupling member and surface mount adapter 803 and the scanning and monitoring module 501 attached to the integrated rotary coupling member and surface mount adapter 803 by the snap-to-fit configurations 513 and a ridge portion of the lower housing 703 according to some embodiments. FIG. 7 further illustrates directional arrow 515 indicating that the scanning and monitoring module 501 rotates about a Z-axis according to one or more aspects of the disclosed subject matter.

In some aspects of the disclosed subject matter, the angle of incidence for images to be captured by the ultrasound transducer 701 may be tilted through an angle α from the perpendicular as shown in FIG. 7. Tilting of the angle of incidence for images to be captured by the ultrasound transducer 701 assists the user in locating and/or focusing on a region of interest (ROI) at the target site 107 of the subject's body 109.

In the magnified section 901, FIG. 7 further illustrates the conductive contacts 705 protruding from the bottom surface of the lower housing 703 and being physically engaged with the conductive tracks 523 of the bio-signal rotary connection 517. As the scanning and monitoring module 501 rotates about the Z-axis, the conductive contacts 705 remain engaged and in physical contact with the conductive tracks 523 of the bio-signal rotary connection 517. According to some aspects of the disclosed subject matter the bio-signal rotary connection 517 electrically connects the electrodes of the electrode array (e.g., first electrode 505, second electrode 507, and third electrode 509) to the scanning and monitoring module 501 and maintains the electrical connection and reception of the bio-signals throughout the rotation of the scanning and monitoring module 501.

FIG. 7 further illustrates the one or more semiconductor chips 719 and the one or more batteries 721 on a first side of the printed circuit board (PCB) 707 and a second semiconductor chip 903 on a second side of the printed circuit board (PCB) 707 opposite from the first side according to one or more aspects of the discloses subject matter. In some embodiments the one or more semiconductor chips 719 comprises a processor (e.g., system on chip (SoC)) for controlling the operation of the ultrasound transducer 701 and the second chip 903 comprises a second process (e.g., a second system on chip (SoC)) for controlling the communication of the bio-signals. In other embodiments, the one or more semiconductor chips 719 may be on the second side of the printed circuit board (PCB) 707 and the second semiconductor chip 903 may be on the first side of the printed circuit board (PCB) 707. In still other embodiments, the one or more semiconductor chips 719 and the second semiconductor chip 903 may be on the same side of the printed circuit board (PCB) 707.

In some other embodiments, the second semiconductor chips 903 for controlling the communication of the bio-signals are provided on the printed circuit board (PCB) 707; however, the ultrasound transducer 701 and the processor (e.g., system on chip (SoC)) for controlling the operation of the ultrasound transducer 701 are not provided on the printed circuit board (PCB) 707. In such embodiments, the scanning and monitoring module 501 only performs the functions of wireless bio-signal monitoring. As such, the wearable medical device 101 and the second wearable ultrasound and biomarker monitoring device 801 are referred to as a wearable biomarker monitoring device.

According to one or more aspects of the disclosed subject matter, the various components of the wearable medical device 101 described above are configured as a self-contained wearable patch-which can either be adhesively secured to the user's skin (or to a garment in direct contact with the user's skin), or alternatively secured or otherwise integrated into the fabric of a garment that is in direct contact with the user's skin. In each such instance, the wearable medical device 101 is configured as a wearable, flexible solution for providing remote ambulatory monitoring of the target site. Thus, in embodiments where the wearable medical device 101 is utilized in the context of MSK ultrasounds (which are normally used to generate ultrasound images of muscles, tendons, ligaments and joints throughout the body, helping to diagnose sprains, strains, tears, and other soft tissue conditions), the wearable medical device 101 will allow real-time data collection in the sports medicine and real-time healthcare monitoring domains, while also being useful in a multitude of advanced applications, including human-machine interfaces, smart medical prosthetics (bionics), electronic skins, wearable consumer electronics and soft robotics, to name a few. Furthermore, by incorporating the scanning and monitoring module 501 and bio-signal sensing in at least one embodiment, the wearable medical device 101 is capable of functioning as a multi-modal system that simultaneously acquires ultrasonic imaging, electrophysiological, hemodynamic, and oxidative metabolic information of muscle activity in biomedical and clinical applications.

In closing, regarding the exemplary embodiments of the present invention as shown and described herein, it will be appreciated that a wearable ultrasound apparatus is disclosed and configured for use in connection with various biomedical applications, including musculoskeletal ("MSK") imaging and analysis. Because the principles of the invention may be practiced in a number of configurations beyond those shown and described, it is to be understood that the invention is not in any way limited by the exemplary embodiments, but is generally directed to a wearable ultrasound apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

In the above descriptions any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 8:
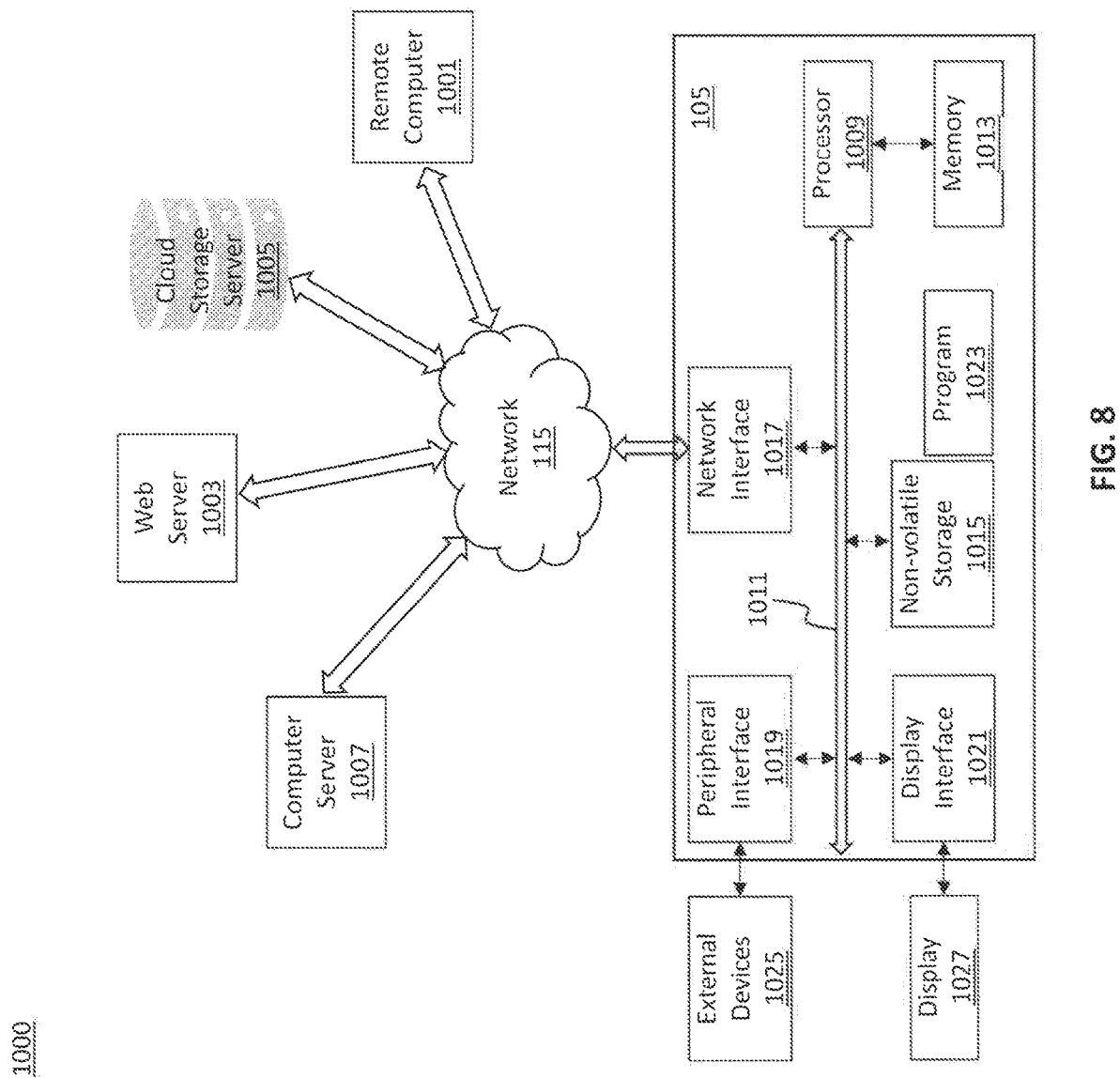
FIG. 8 is a functional block diagram illustrating a user device connected to a networked system of one or more networked computers and servers, according to some exemplary aspects of the disclosed subject matter.

FIG. 8 is a functional block diagram illustrating user device 105 connected to a networked system 1000 of one or more networked computers and servers. In an embodiment, the hardware and software environment illustrated in FIG. 8 may provide an exemplary platform for implementation of the software and/or methods according to the present disclosure.

According to some embodiments, a networked system 1000 may include, but is not limited to, user device 105, network 115, remote computer 1001, web server 1003, cloud storage server 1005 and computer server 1007. Additionally, it should be appreciated that user device 105 can represent one or more of the remote computer 1001, web server 1003, cloud storage server 1005 and computer server 1007.

Additional details of user device 105 is shown in FIG. 8. The functional blocks illustrated within user device 105 are provided only to establish exemplary functionality and are not intended to be exhaustive. And while details are not provided for remote computer 1001, web server 1003, cloud storage server 1005 and computer server 1007, these other computers and devices may include similar functionality to that shown for user device 105.

User device 105 may be a personal computer (PC), a desktop computer, laptop computer, notebook computer, tablet computer, netbook computer, a personal digital assistant (PDA), a smart phone, or any other programmable electronic device capable of communicating with other devices on network 115.

User device 105 may include processor 1009, bus 1011, memory 1013, non-volatile storage 1015, network interface 1017, peripheral interface 1019 and display interface 1021. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1009 may be one or more single or multi-chip microprocessors, such as those designed and/or manufactured by Intel Corporation, Advanced Micro Devices, Inc. (AMD), Arm Holdings (Arm), Apple Computer, or the like. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 1011 may be a proprietary or industry standard high-speed parallel or serial peripheral interconnect bus, such as ISA, PCI, PCI Express (PCI-e), AGP, and the like.

Memory 1013 and non-volatile storage 1015 may be computer-readable storage media. Memory 1013 may include any suitable volatile storage devices such as Dynamic Random Access Memory (DRAM) and Static Random Access Memory (SRAM). Non-volatile storage 1015 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1023 may be a collection of machine-readable instructions and/or data that is stored in non-volatile storage 1015 and is used to create, manage, and control certain software functions that are discussed in detail elsewhere in the present disclosure and illustrated in the drawings. In some embodiments, memory 1013 may be considerably faster than non-volatile storage 1015. In such embodiments, Program 1023 may be transferred from non-volatile storage 1015 to memory 1013 prior to execution by processor 1009.

User device 105 may be capable of communicating and interacting with other computers via network 115 through network interface 1017. Network 115 may be, for example, a local area network (LAN), a wide area network (WAN) such as the Internet, or a combination of the two, and may include wired, wireless, or fiber optic connections. In general, network 115 can be any combination of connections and protocols that support communications between two or more computers and related devices.

Peripheral interface 1019 may allow for input and output of data with other devices that may be connected locally with user device 105. For example, peripheral interface 1019 may provide a connection to external devices 1025. External devices 1025 may include devices such as a keyboard, a mouse, a keypad, a touch screen, and/or other suitable input devices. External devices 1025 may also include portable computer-readable storage media such as, for example, thumb drives, portable optical or magnetic disks, and memory cards. Software and data used to practice embodiments of the present disclosure, for example, Program 1023, may be stored on such portable computer-readable storage media. In such embodiments, software may be loaded onto non-volatile storage 1015 or, alternatively, directly into memory 1013 via peripheral interface 1019. Peripheral interface 1019 may use an industry standard connection, such as RS-232 or Universal Serial Bus (USB), to connect with external devices 1025.

Display interface 1021 may connect user device 105 to display 1027. Display 1027 may be used, in some embodiments, to present a command line or graphical user interface to a user of user device 105. Display interface 1021 may connect to display 1027 using one or more proprietary or industry standard connections, such as VGA, DVI, DisplayPort and HDMI.

As described above, network interface 1017 provides for communications with other computing and storage systems or devices external to user device 105. Software programs and data discussed herein may be downloaded from, for example, remote computer 1001, web server 1003, cloud storage server 1005 and computer server 1007 to non-volatile storage 1015 through network interface 1017 and network 115. Furthermore, the systems and methods described in this disclosure may be executed by one or more computers connected to user device 105 through network interface 1017 and network 115. For example, in some embodiments the systems and methods described in this disclosure may be executed by remote computer 1001, computer server 1007, or a combination of the interconnected computers on network 115. Mobile applications, subscription website data, datasets and/or databases employed in embodiments of the systems and methods described in this disclosure may be stored and or downloaded from one or more of the remote computer 1001, web server 1003, cloud storage server 1005 and computer server 1007.

The control aspects and computational aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C#, or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

According to some aspects of the disclosed subject matter, a wearable medical device that is placeable on a target site of a subject's body includes: a rotary coupling component including a plurality of conductive tracks; an electrode patch including an electrode array, the electrode patch being configured for attachment to the rotary coupling component and, when the electrode patch is attached, electrodes of the electrode array are electrically coupled to corresponding tracks of the conductive tracks; and a scanning and monitoring module including a set of conductive contacts, the scanning and monitoring module being configured for attachment to the rotary coupling component opposite the electrode patch, when the scanning and monitoring module is attached, the set of conductive contacts are engaged with corresponding tracks of the plurality of conductive tracks, wherein the scanning and monitoring module is further configured to rotate about the rotary coupling component with the plurality of conductive contacts remaining engaged with the corresponding tracks during rotation of the scanning and monitoring module. In some embodiments, the scanning and monitoring module further includes: an ultrasound transducer configured to acquire ultrasound images of the target site; a bio-signal sensor configured to obtain bio-signals of the target site from the electrode array; and a printed circuit board electrically coupled to the ultrasound transducer and the bio-signal sensor, the printed circuit board including circuitry being configured to simultaneously acquire the ultrasound images and obtain the bio-signals during the rotation of the scanning and monitoring module. According to some embodiments, the conductive contacts are POGO pins. In some embodiments, the ultrasound transducer acquires images in at least a longitudinal cutting plane when the scanning and monitoring module is rotated to a first degree of rotation and in a transverse cutting plane when the scanning and monitoring module is rotated to a second degree of rotation. According to one or more aspects of the disclosed subject matter, the scanning and monitoring module is rotated manually. In some embodiments, the wearable medical device further includes a motor electrically coupled to the printed circuit board, the motor being configured to automatically rotate the scanning and monitoring module. According to some embodiments, the wearable medical device further includes a wireless transceiver electrically connected to the printed circuit board and configured to wirelessly communicate the acquired ultrasound images and the obtained bio-signals to a user device.

According to one or more aspects of the disclosed subject matter, an ultrasound imaging and biomarker monitoring system includes: a wearable wireless medical device including an ultrasound transducer for acquiring ultrasound images and a bio-signal sensor for obtaining bio-signals, the wireless medical device being configured for simultaneously acquiring the ultrasound images and obtaining the bio-signals from a target site of a subject wearing the wireless medical device and while the subject performs an activity; an analysis platform configured to extract an image biomarker from the acquired ultrasound images and obtained bio-signals; and a user device configured to display the acquired ultrasound images, the obtained bio-signals, and display the extracted image biomarker while the subject performs the activity. In some embodiments, the ultrasound transducer is rotatable, and the ultrasound transducer acquires images in at least a longitudinal cutting plane at a first degree of rotation and in a transverse cutting plane at a second degree of rotation. In some aspects of the disclosed subject matter, the wearable wireless medical device further includes a motor configured to automatically rotate the ultrasound transducer. In accordance with some embodiments, the wearable wireless medical device further includes an indicator configured to provide a first indication when the ultrasound transducer is rotated to the first degree of rotation and provide a second indication when the ultrasound transducer is rotated to the second degree of rotation, the second indication being different from the first indication. In some embodiments, the ultrasound imaging and biomarker monitoring system further includes an indicator light for providing the first indication and the second indication as visual indicators. According to some embodiments, the wearable wireless medical device further includes: a rotary coupling component including a plurality of conductive tracks; an electrode patch including an electrode array, the electrode patch being configured for attachment to the rotary coupling component and, when the electrode patch is attached, electrodes of the electrode array are electrically coupled to corresponding tracks of the conductive tracks; and an ultrasound transducer housing including a set of conductive contacts, the ultrasound transducer housing being configured for attachment to the rotary coupling component opposite the electrode patch, when the ultrasound transducer housing is attached, the set of conductive contacts are engaged with corresponding tracks of the plurality of conductive tracks, wherein the ultrasound transducer housing is further configured to rotate about the rotary coupling component with the plurality of conductive contacts remaining engaged with the corresponding tracks during rotation of the ultrasound transducer housing. In some aspects of the disclosed subject matter, the analysis platform is further configured to process and quantify the acquired ultrasound images and the physiological and motion parameter using convolutional neural networks and developed algorithms to extract the biomarker.

According to one or more aspects of the disclosed subject matter, a method of using a wearable wireless medical device includes: placing the wearable wireless medical device on a target site of a subject's body; acquiring ultrasound images of the target site and obtaining bio-signals of the target site via the wireless medical device while the subject is performing an activity; extracting a biomarker by processing and quantifying the acquired ultrasound images and bio-signals; and simultaneously displaying on a user device, the ultrasound images, the bio-signals, and the biomarker of the target site. In some embodiments, placing the wearable wireless medical device on the target site includes: attaching a scanning and monitoring module to a rotary coupling component, wherein the scanning and monitoring module rotates about the rotary coupling component and conductive contacts of the scanning and monitoring module are physically engaged and electrically coupled to conductive tracks of the rotary coupling component; and attaching an electrode patch to the rotary coupling component opposite the scanning and monitoring module, wherein an electrode array of the electrode patch is electrically coupled to external contacts of the rotary coupling component, the external contacts being electrically coupled through the rotary coupling component to the conductive tracks. According to some embodiments, the method further includes rotating the scanning and monitoring module and acquiring ultrasound images in at least a longitudinal cutting plane at a first degree of rotation and in a transverse cutting plane at a second degree of rotation. In one or more embodiments, extracting the image biomarker by processing and quantifying the acquired ultrasound images and bio-signals further includes using convolutional neural networks and developed algorithms to extract the biomarker. In some aspects of the disclosed subject matter, the wearable wireless medical device further includes a motor and rotating the scanning and monitoring module further includes using the motor to automatically rotate the ultrasound transducer. According to embodiments, the wearable wireless medical device further includes a wireless transceiver, and the method further includes using the wireless transceiver to wirelessly communicate the acquired ultrasound images and the obtained bio-signals to the user device.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A wearable medical device that is placeable on a target site of a subject's body, the wearable medical device comprising:
    a rotary coupling component comprising a plurality of conductive tracks;
    an electrode patch comprising an electrode array, the electrode patch being configured for attachment to the rotary coupling component and, when the electrode patch is attached, electrodes of the electrode array are electrically coupled to corresponding tracks of the conductive tracks; and
    a scanning and monitoring module comprising a set of conductive contacts, the scanning and monitoring module being configured for attachment to the rotary coupling component opposite the electrode patch, when the scanning and monitoring module is attached, the set of conductive contacts are engaged with corresponding tracks of the plurality of conductive tracks, wherein the scanning and monitoring module is further configured to rotate about the rotary coupling component with the plurality of conductive contacts remaining engaged with the corresponding tracks during rotation of the scanning and monitoring module.

2. The wearable medical device of claim 1, wherein the scanning and monitoring module further comprises:
    an ultrasound transducer configured to acquire ultrasound images of the target site;
    a bio-signal sensor configured to obtain bio-signals of the target site from the electrode array; and
    a printed circuit board electrically coupled to the ultrasound transducer and the bio-signal sensor, the printed circuit board comprising circuitry being configured to simultaneously acquire the ultrasound images and obtain the bio-signals.

3. The wearable medical device of claim 2, wherein the conductive contacts are POGO pins.

4. The wearable medical device of claim 2, wherein the ultrasound transducer acquires images in at least a longitudinal cutting plane when the scanning and monitoring module is rotated to a first degree of rotation and in a transverse cutting plane when the scanning and monitoring module is rotated to a second degree of rotation.

5. The wearable medical device of claim 2, wherein the scanning and monitoring module is rotated manually.

6. The wearable medical device of claim 2, further comprises a motor electrically coupled to the printed circuit board, the motor being configured to automatically rotate the scanning and monitoring module.

7. The wearable medical device of claim 2, further comprising a wireless transceiver electrically connected to the printed circuit board and configured to wirelessly communicate the acquired ultrasound images and the obtained bio-signals to a user device.

* * * * *